United States Patent
Azari et al.

(10) Patent No.: US 9,361,377 B1
(45) Date of Patent: Jun. 7, 2016

(54) CLASSIFIER FOR CLASSIFYING DIGITAL ITEMS

(75) Inventors: David R. Azari, Seattle, WA (US); Tanvi M. Bhadbhade, Seattle, WA (US); Lee M. Miller, Seattle, WA (US); Alan Kipust, Mercer Island, WA (US); Cynthia A. Prentice, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 242 days.

(21) Appl. No.: 13/345,525

(22) Filed: Jan. 6, 2012

(51) Int. Cl.
 *G06F 7/00* (2006.01)
 *G06F 17/30* (2006.01)
(52) U.S. Cl.
 CPC .... *G06F 17/30864* (2013.01); *G06F 17/30029* (2013.01); *G06F 17/30256* (2013.01); *G06F 17/30707* (2013.01)
(58) Field of Classification Search
 None
 See application file for complete search history.

(56) References Cited

U.S. PATENT DOCUMENTS

| | | | |
|---|---|---|---|
| 8,649,613 B1* | 2/2014 | Leung et al. | 382/224 |
| 8,713,007 B1* | 4/2014 | Korolev | G06N 5/048 707/729 |
| 2004/0208361 A1* | 10/2004 | Buzuloiu et al. | 382/165 |
| 2006/0173985 A1* | 8/2006 | Moore | 709/223 |
| 2008/0177684 A1* | 7/2008 | Laxman | G06K 9/6256 706/20 |
| 2008/0178302 A1* | 7/2008 | Brock et al. | 726/32 |
| 2009/0034851 A1* | 2/2009 | Fan et al. | 382/230 |
| 2010/0082592 A1* | 4/2010 | Ruvini et al. | 707/706 |
| 2010/0211551 A1* | 8/2010 | Ryu | 707/687 |
| 2010/0251305 A1* | 9/2010 | Kimble | H04N 7/1318 725/46 |
| 2010/0268628 A1* | 10/2010 | Pitkow et al. | 705/34 |
| 2010/0306229 A1* | 12/2010 | Timm et al. | 707/767 |
| 2010/0310158 A1* | 12/2010 | Fu et al. | 382/159 |
| 2011/0173037 A1* | 7/2011 | Attenberg et al. | 705/7.11 |
| 2012/0096514 A1* | 4/2012 | Tuscano et al. | 726/1 |

* cited by examiner

*Primary Examiner* — Tuan A Pham
(74) *Attorney, Agent, or Firm* — Lee & Hayes, PLLC; Shiv S. Naimpally

(57) ABSTRACT

Systems, devices, and processes for classifying a digital item are described. In some examples, a first classifier determines whether a digital item, such as an electronic book (eBook), includes content of a first category that is acceptable for publication by a publisher. A second classifier determines whether the digital item includes content of a second category that is acceptable for publication by a publisher. In response to determining that the digital item includes content of the first category or content of the second category, a third classifier may determine whether the digital item includes a phrase that is indicative of content of a third category that is unacceptable for publication.

17 Claims, 8 Drawing Sheets

600

```
┌─────────────────────────────────────────────────────────────────┐
│ IDENTIFY FIRST EXCERPTS FROM A FIRST SET OF DOCUMENTS THAT CAUSE │
│      THE FIRST SET OF DOCUMENTS TO BE CLASSIFIED AS OFFENSIVE    │
│                              602                                 │
└─────────────────────────────────────────────────────────────────┘
                                 │
                                 ▼
┌─────────────────────────────────────────────────────────────────┐
│  SELECT SECOND EXCERPTS FROM A SECOND SET OF DOCUMENTS THAT ARE  │
│                    CLASSIFIED AS NON-OFFENSIVE                   │
│                              604                                 │
└─────────────────────────────────────────────────────────────────┘
                                 │
                                 ▼
┌─────────────────────────────────────────────────────────────────┐
│           TRAIN A CLASSIFIER USING THE FIRST EXCERPTS            │
│                    AND THE SECOND EXCERPTS                       │
│                              606                                 │
└─────────────────────────────────────────────────────────────────┘
```

FIG. 6

CLASSIFIER FOR CLASSIFYING DIGITAL ITEMS

BACKGROUND

Online publishing provides opportunities to make content available to the public more quickly and more cheaply than through traditional publishing channels. As a result, a large volume of online content can be made available at a scale that traditional publishing may find difficult to match. However, publishing large volumes of content places a burden on publishers to identify and prevent publication of inappropriate and/or illegal content. Manual classification may be time consuming while conventional automated classifiers may have difficulties determining the difference between appropriate content and inappropriate content. For example, an automated classifier may erroneously classify a biography or a psychotherapy textbook that describes sexual abuse as inappropriate content.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 6 is a flow diagram of an example process 600 to train a phrase-based classifier according to some implementations.

DETAILED DESCRIPTION

Overview

Figure 1:
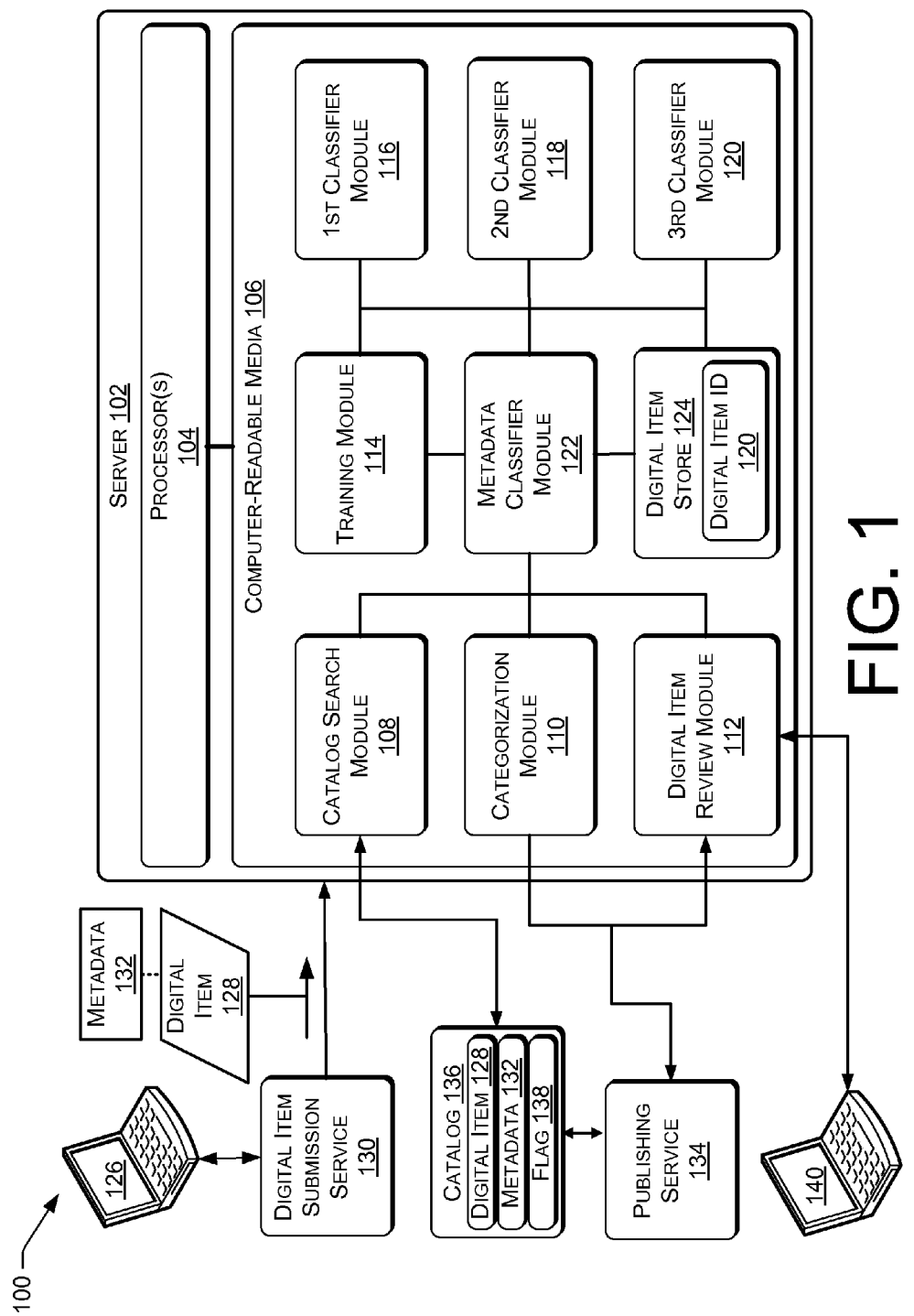
FIG. 1 shows an illustrative architecture that includes content classifiers for classifying digital items according to some implementations.

Online publishers can quickly publish large numbers of digital items at a scale and speed that traditional publishers find difficult to match. Each of the digital items may include text content, graphical content, picture content, audio content, video content, other multimedia content, or combinations thereof. For example, the digital item may be an electronic book (eBook), a movie, an album (e.g., music or spoken word), and the like. The items may be acquired by individuals via one or more physical locations, via one or more sites (e.g. a site of a merchant, an online retailer site, etc.), or combinations thereof. In some cases, merchants may provide items acquired by individuals to locations specified by the individuals, such as via mobile services, delivery, etc. The acquisition of items by individuals may be achieved through various means of providing value for the items, such as purchasing items, renting items, borrowing items, trading items, bartering items, etc.

When digital items are submitted to an online publisher for publication, the online publisher may classify the digital items in various different classes or categories of acceptability based on the content of each digital item. For example, the online publisher may classify a digital item in one category of acceptability, e.g., as offensive, if the digital item includes content that is obscene or illegal. As another example, the online publisher may classify a digital item in a different category of acceptability, e.g., as erotica or mature subject matter, if the digital item includes content that is suitable only for mature (e.g., older than a particular age) audiences. As another example, the online publisher may classify a digital item in yet another category of acceptability, e.g., as pornography if the digital item includes explicit content. As another example, the online publisher may classify a digital item in still another category of acceptability, e.g., as suitable for a general audience, if the digital item includes content that is non-offensive, non-pornographic, and non-erotic. Of course, other classification systems with a finer or coarser granularity (e.g., more classes/categories or fewer classes/categories) are possible. As previously mentioned, manually classifying each item may be time consuming for a large number of digital items. Embodiments of the present disclosure provide a scalable architecture for automated classification of digital items.

A classifier that includes algorithms to analyze and classify the content of a digital item may be used to automatically (e.g., without human interaction) classify digital items. In some embodiments, the classifier may include one or more classifier modules. Different types of classifier modules may be used, including word-based classifier modules and phrase-based classifier modules.

A word-based classifier module may be trained using training documents. The documents may be digital items, such as eBooks. Each of the training documents may have associated metadata that includes a previously assigned category (e.g., classification). A particular category selected from multiple categories may be assigned to a particular document by the classifier module, by a human being, or both.

In some implementations, the training documents may be pre-processed before the training documents are analyzed. For example, the pre-processing may include removing punctuation and numbers from the digital item, removing stop words from the digital item, stemming some of the words in the digital item, and the like. Stop words may be words that do not meaningfully contribute to determining a category of a document, such as "and", "the", etc. Stemming may include reducing inflected or derived words in the training documents to their stem (e.g., root) form. For example, a stemming algorithm may reduce the words "fishing," "fished," "fish," or "fisher" to the stem word, "fish."

For each category, the training documents that have been assigned to that category may be analyzed to determine various characteristics, such as a term frequency (TF) and an inverse document frequency (IDF) of each word. The term frequency identifies how frequently each word occurs in a particular document. A word that occurs more frequently may be more indicative of a particular category (e.g., relative to less frequently occurring words). The inverse document frequency measures how unique each word is to each document in each category, e.g., a word that occurs frequently in documents that are in more than one category may be less indicative of the category while a word that occurs frequently in documents in a particular category may be more indicative of the category. The inverse document frequency may be based on dividing the total number of training documents in a particular category by the number of training documents in the particular category that contain the term.

A score may be assigned to a particular word based on the term frequency of the particular word and the inverse document frequency of the particular word. For example, a document may contain 100 words and the word "cow" may appear 3 times in the document. The term frequency for the word "cow" may be calculated as (3/100)=0.03. If there are 10 million training documents and the word "cow" appears in one thousand of these, then the inverse document frequency may be calculated as log(10,000,000/1,000)=4. The word cow may then be associated with a score that is calculated as a product of the term frequency and the inverse document frequency: 0.03×4=0.12. Thus, the score associated with each word may be a fractional number between zero and one.

In some implementations, the score may be normalized to account for a length of each document (e.g., how many words are included in the document) to take into account that a particular word may occur more frequently in a longer document than in a shorter document. For example, the term frequency of a particular word in a document may be divided by the frequency of the most common word in the document to calculate a normalized term frequency of the particular word. As another example, the term frequency of a particular word in a document may be divided by the number of words (e.g., after preprocessing) in the document to calculate a normalized term frequency of the particular word.

Based on the score of each word in each training document associated with a particular category, a predetermined number of words may be selected to represent the particular category. For example, at least two thousand of the highest scoring words in the training documents in each category may be selected to represent the category. Based on the words selected to represent the category and their corresponding scores, a word vector may be created for each document in the category. For example, if N represents the number of words selected to represent the category, I represents a word in a document, J represents the document, then a word vector for the document in a particular category may be represented as an N-dimensional vector $D_J=\{(W_{I,J}) \ldots (W_{N,J})\}$, where $W_{I,J}$ is the weight of the word I in the document J. A classifier may be created based on the word vectors for each document in a particular category. For example, the classifier for a particular category may be a matrix in which each row is a word vector that represents each training document. The matrix may be mapped to describe areas in multi-dimensional space. When a new document is received for classification, the classifier for a particular category may create a word vector that represents the new document. The classifier may determine whether the word vector for the new document maps to one of the areas described by the matrix of word vectors that describe the category space. In this way, the classifier for a particular category may determine whether the new document is to be assigned to the particular category.

Phrase-based classifier modules may be used in addition to or in place of the word-based classifiers described above. A phrase may include two or more words. For example, a publisher may desire to identify documents submitted for publication that include certain types of content that the publisher considers unsuitable for publishing, such as documents that include inappropriate, offensive, or illegal content. To illustrate, the publisher may desire to identify documents that include content such as bestiality, incest, pedophilia, or rape (BIPR) and the like. In some cases, the difference between material (e.g., erotica or pornography) that is suitable for publication and BIPR may be particular phrases (e.g., excerpts) such that if the particular phrases were removed, the material might be suitable for publication. For example, in a document that describes a sexual encounter, a phrase indicating that a participant in the sexual encounter is very young might identify content that includes pedophilia. Similarly, a phrase indicating that a participant in the sexual encounter is a family member might identify content that includes incest. A phrase-based classifier to identify inappropriate (e.g., BIPR) content may be trained using phrases (e.g., excerpts) selected from documents that are suitable for publication and phrases selected from documents that are unsuitable for publication. The phrase-based classifier may be created, trained, and used similar to a word-based classifier except that the phrase-based classifier may use phrases instead of words. For example, a predetermined number of phrases may be selected to represent the BIPR category. Based on the phrases selected to represent the category and their corresponding scores, a phrase vector may be created. For example, if N represents the number of phrases selected as indicative of BIPR, I represents a phrase in a document, J represents the document, then a phrase vector for the document may be represented as an N-dimensional vector $D_J=\{(P_{I,J}) \ldots (P_{N,J})\}$, where $P_{I,J}$ is the weight of the phrase I in the document J. Thus, a phrase-based classifier may include an N-dimensional phrase vector.

When the phrase-based classifier receives a new document for classification, the phrase-based classifier may break up the new document into phrases. The phrases may be of a fixed length, a variable length, or a combination of both. For example, a predetermined number of words (e.g., fifty, seventy-five, one hundred, and the like) may be repeatedly selected from a sentence to create phrases having a fixed length. When there are less than the predetermined number of words remaining in the sentence, the remaining words of the sentence may be selected to create a phrase that may vary in length (e.g., based on the length of the sentence).

In some implementations, the phrase-based classifier may be used after one or more word-based classifiers have indicated that the document (or associated metadata) includes adult-oriented content. For example, after the one or more word-based classifiers indicate that the document or the associated metadata includes adult-oriented content, the phrase-based classifier may determine whether the new document includes any phrases that are indicative of BIPR. The phrase-based classifier may determine a frequency with which the phrases occur in the new document to determine whether the new document includes BIPR. For example, documents that are suitable for publication (e.g., crime novels, biographies, psychotherapy books, and the like) may include phrases that are indicative of BIPR but the phrases may occur relatively infrequently as compared to documents that are unsuitable for publication. In some implementations, the phrase-based classifier may highlight (e.g., call attention to) particular phrases that resulted in the classifier identifying BIPR content in a particular document to enable a human reviewer to review the phrases.

Thus, multiple classifiers, including word-based classifiers, phrase-based classifiers, other types of classifiers, or any combination thereof, may be used to create an automated classification system to classify documents submitted for publication. A classifier associated with a particular category may determine whether to associate the particular category with a submitted document. In some implementations, at least some of the multiple classifiers may operate substantially contemporaneously (e.g., substantially simultaneously) to classify a submitted document. Based on the results of the multiple classifiers, the automated classification system may determine whether the submitted document may be classified as suitable for publication. If the publication is classified as suitable for publication, the automated classification system may determine a category (e.g., general audience, mature/erotic, pornography, and the like) to be associated with the document when it is published. In some instances, the automated classification system may indicate a level of certainty as to the resulting classification. A human reviewer may review the classification if the level of certainty satisfies a predetermined threshold. For example, if a classifier has less than a ninety-percent certainty associated with a classification of a digital item, the classification may be assigned to a reviewer for manual review.

The scalable automated classification system may include modules for automatically (e.g., without human interaction) classifying digital items. Automating the publishing decisions takes human reviewers out of the workflow, thereby speeding the process and allowing the process to scale. Where the automated decision modules lack sufficient certainty to make unequivocal decisions regarding how a digital item is to be handled, tentative or suggested decisions regarding how the digital item is to be handled may be generated in order to facilitate manual review. The scalable architecture includes various modules for classifying a digital item's content, classifying metadata associated with the document, and identifying documents for manual review.

Illustrative Framework

FIG. 1 shows an illustrative framework 100 that includes classifiers for classifying digital items. While specific categories, such as pornography, erotica, and general audience are used as examples, the framework 100 may be scaled from a two-category (e.g., suitable for publication category or an unsuitable for publication category) classification system to a multiple-category (e.g., such as one or more of a child category, a teenager category, a young adult category, a mature category, an erotic category, a pornography category and the like) by varying the number of classifiers. For example, adding additional classifiers to the framework 100 may enable increasing a number of categories that may be assigned to a digital item. The framework 100 includes a server 102 that may be comprised of multiple servers. The server 102 may include one or more processors 104 and a computer-readable media 106. The terms erotica and pornography are used as examples of adult-oriented classifications. The term erotica, as used herein, refers to a first type of adult-oriented content that may deal with erotically stimulating or sexually arousing content. The term pornography, as used herein, refers to a second type of adult-oriented content that may graphically and/or explicitly depict sexually-related situations.

The computer-readable media 106 may include read-only memory, random access memory (RAM), disk-based storage, other types of storage, or any combination thereof. The computer-readable media 106 may be used to store modules, databases, and the like. The modules stored in the computer-readable media 106 may include instructions that are executable by the processors 104 to perform the various functions provided by the server 102, as described herein. For example, in FIG. 1, the computer-readable media 106 includes a catalog search module 108, a categorization module 110, a digital item review module 112, a training module 114, a first classifier module 116, a second classifier module 118, a third classifier module 120, and a metadata classifier module 122. The metadata classifier module 122 may determine whether the metadata 132 (e.g., a title or description) associated with the digital item 128 includes words or phrases that are indicative of a particular type of content, such as adult-oriented content. In some implementations, the first classifier module 116 may determine whether the digital item 128 includes pornographic content, the second classifier module 118 may determine whether the digital item includes erotica or other types of mature content, and the third classifier module 120 may determine whether the digital item 128 includes offensive or illegal content (e.g., BIPR). Of course, the computer-readable media 106 may include additional modules (e.g., additional classifier modules) to perform additional functions. The computer-readable media 106 may also include one or more data stores, such as a digital item store 124.

The training module 114 may train one or more of the classifier modules 116, 118, 120, or 122. For example, the training module 114 may train the classifier modules 116, 118, 120, or 122 to classify items that are submitted for publication to the server 104. Each of the classifier modules 116, 118, 120, or 122 may use word-based classification algorithms, excerpt-based classification algorithms, or a combination of both.

In operation, a submitter device 126 may submit a digital item 128, such as an electronic book ("eBook"), to a digital item submissions service 130. The digital item 128 may include various components, such as digital content and associated metadata 132 (e.g., title, description, and the like). The digital content may include one or more of text-based content, images, figures, audio, video, other content or any combination thereof. The digital item submissions service 130 may submit the digital item 128 to the server 102 for publishing.

In response to receiving the digital item 128, the server 102 may assign a digital item identifier 120 to the digital item 128. The server 102 may store the digital item 128 and the digital item identifier 120 in the digital item store 124. The server 102 may determine whether the submitted digital item 128 is suitable for publication and if suitable for publication, what category (e.g., general audience, pornography, erotica, and the like) should be assigned to the digital item 128 after publication.

The server 102 may cause one or more automated analysis processes to be performed on the digital content and/or metadata that is associated with the digital item 128. These automated analysis processes may be performed by one or more of the classifier modules 116, 118, 120, or 122. In some implementations, at least two of the classifier modules 116, 118, 120, or 122 may operate substantially contemporaneously (e.g., substantially simultaneously).

The metadata classifier module 122 may determine whether the metadata 132 indicates that the digital item 128 may include content that is not suitable for a general audience, such as erotica or pornography. The first classifier module 116 may determine whether the content of the digital item 128 includes pornography. The second classifier module 118 may determine whether the content of the digital item 128 includes erotica. The third classifier module 120 may determine whether the content of the digital item 128 includes BIPR.

Based on the results of one or more of the classifier modules 116, 118, 120, or 122, the categorization module 110 may automatically (e.g., without human interaction) determine whether to publish the digital item 128. One or more of the classifier modules 116, 118, 120, or 122 may provide a confidence level associated with each of their respective classifications. The categorization module 110 may make decisions based on the confidence level provided by each of the classifier modules 116, 118, 201, or 122. For example, if the digital item 128 is determined to be predominantly BIPR, the categorization module 110 may automatically categorize the digital item 128 as unsuitable for publication if a confidence level provided by the third classifier module 120 satisfies a first predetermined threshold. For example, the categorization module 110 may automatically categorize the digital item 128 as unsuitable for publication when the confidence level is ninety-five percent or greater that the digital item 128 includes BIPR. If the digital item 128 excludes BIPR or is not predominantly BIPR, the categorization module 110 may categorize the digital item 128 as suitable for publication and provide the digital item 128 to a publishing service 134 if a confidence level provided by the third classifier module 120 satisfies a second predetermined threshold. For example, the categorization module 110 may automatically categorize the digital item 128 as suitable for publication when the confidence level is five percent or less that the digital item 128 includes BIPR. In some cases, if the BIPR classifier 116 determines that the digital item 128 includes BIPR, the first classifier module 116 may indicate that the digital item 128 is to be manually reviewed (e.g., by a human). For example, if the confidence level provided by the third classifier module 120 does not satisfy either the first predetermined threshold (e.g., ninety-five percent or greater) or the second predetermined threshold (five percent or less) the first classifier module 116 may provide the digital item 128 for manual review, To expedite the manual review, the first classifier module 116 may identify those phrases from the digital item 128 that indicate BIPR.

The publishing service 134 may receive the digital item 128 from the categorization module 110 and make the digital item 128 available for acquisition (e.g., purchase or rental) by placing the digital item 128 in a catalog 136. The catalog search module 108 may enable performing a search of the catalog 136. For example, in response to a user request, the catalog search module 108 may perform a search on the catalog 136 and provide search results that include a title of the digital item 128. In some cases, the categorization module 110 may instruct the publishing service 134 to set a flag 138 such that when the catalog search module 108 searches the catalog 136, the metadata 132 is excluded from the search results. For example, if the digital item 128 includes mature content (e.g., pornography, erotic content, or other non-offensive adult content), then the categorization module 110 may instruct the publishing service 134 to set the flag 138 associated with the digital item 128 in the catalog 136. When the flag 138 is set, the catalog search module 108 may exclude the metadata 132 from the search or from the search results. In this way, mature content may be available for acquisition in the catalog 136, but may be excluded from search results provided to individuals that use the catalog search module 108.

In some embodiments, the categorization module 110 may communicate directly with publishing service 134 to automatically publish a digital item. The categorization module 110 may be configured to store a digital item's category in the digital item store 124. In some implementations, after storing a digital item's category in the digital item store 124, the categorization module 110 may flag the digital item for manual review.

The digital item review module 112 may retrieve a list of un-reviewed digital items from the digital item store 124. The digital item review module 112 may include various user interface elements that enable a review device 140 to retrieve a list of un-reviewed digital items. The various user interface elements may enable a reviewer operating the review device 140 to assign unassigned digital items for review, accept or select digital items for review, and to review the digital items. The user interfaces may be displayed on a display of the review device 140. In some embodiments, the user interface elements may include web pages, such as web pages built with hypertext markup language (HTML) data and/or other components, for viewing with a web browser. The user interfaces may include selectable options for making publication decisions regarding the digital item, including rejecting, flagging as accepted with modification, or accepting for publication, or other. The user interface elements may include aspects of the digital item (e.g., at least a portion of the content of the digital item 128 or at least a portion of the metadata 132), and one or more classifications (e.g., publish, do not publish, erotic, pornography, general audience and the like) associated with the digital item.

Thus, the server 102 may include modules to automatically (e.g., without human interaction) classify digital items received for publication into two or more categories. One or more of the modules may automatically identify which of the digital items submitted for publication are suitable for publication and which are unsuitable for publication. If a digital item is identified as unsuitable for publication, one or more of the modules may automatically flag the digital item for manual review. In some cases, the modules may automatically highlight (e.g., draw attention to) portions of the content of the digital item that caused the digital item to be flagged as unsuitable for publication to enable a reviewer to quickly perform the manual review. In this way, a publisher may automate the task of determining whether submitted digital items are suitable for publication and which category to associate with each of the digital items.

Although the functions of the framework 100 are described using documents, the framework 100 may be adapted to classify audio files, video files, and other types of content. For example, in some implementations, the server 102 may include a voice recognition module or other type of speech-to-text module that creates text files based on the audio content of digital items to enable text-based classifiers to classify audio files that are submitted for publication. For example, the server 102 may classify music files that are submitted for publication by determining whether the music includes explicit or mature (e.g., suggestive) lyrics. Similarly, when a video item is submitted, audio associated with the video may be extracted and converted into text to enable classifier modules (e.g., the modules 116, 118, 120, or 122) to classify the video item. For example, movie dialog may be converted to text and analyzed and an appropriate classification (e.g., G, PG, PG13, R, X, and the like) may be associated with the video item.

The computer-readable media 106 may include storage media, such as volatile memory, nonvolatile memory, removable memory, and/or non-removable memory, implemented in any method or technology for storage of information, such as computer-readable instructions, data structures, program modules, or other data. Also, the processor(s) 108 may include onboard memory in addition to or instead of the computer-readable media 106. Examples of storage media that may be included in the computer-readable media 106 and/or processor(s) 108 include, but are not limited to, non-transitory media, such as random access memory (RAM), read only memory (ROM), electrically erasable programmable read only memory (EEPROM), flash memory or other memory technology, compact disk (CD-ROM), digital versatile disks (DVD) or other optical storage, magnetic tape, magnetic disk storage or other magnetic storage devices, or any other medium which can be used to store the desired information and which can be accessed by the processor(s) 104. Any such computer-readable storage media may be part of the framework 100. The computer-readable media 106 may include software programs or other executable modules that may be executed by the processor(s) 104. The computer-readable media 106 may also be used to store the digital item store 124.

Various processes, instructions, methods and techniques described herein may be considered in the general context of computer-executable instructions, such as program modules, executed by one or more computers or other devices. Generally, program modules include routines, programs, objects, components, data structures, etc. for performing particular tasks or implementing particular abstract data types. These program modules can be implemented as software modules that execute on the processor(s) 104, as hardware, and/or as firmware. Typically, the functionality of the program modules may be combined or distributed as desired in various embodiments. An implementation of these modules and techniques may be stored on or transmitted across some form of computer-readable media.

The modules stored in the computer-readable media 106 may be implemented across one or more servers in a cloud computing environment, on a local device, or on a combination of both. The following discussion does not limit the implementation of the modules stored in computer-readable media 106 to any particular device or environment.

Classifier Training

Figure 2:
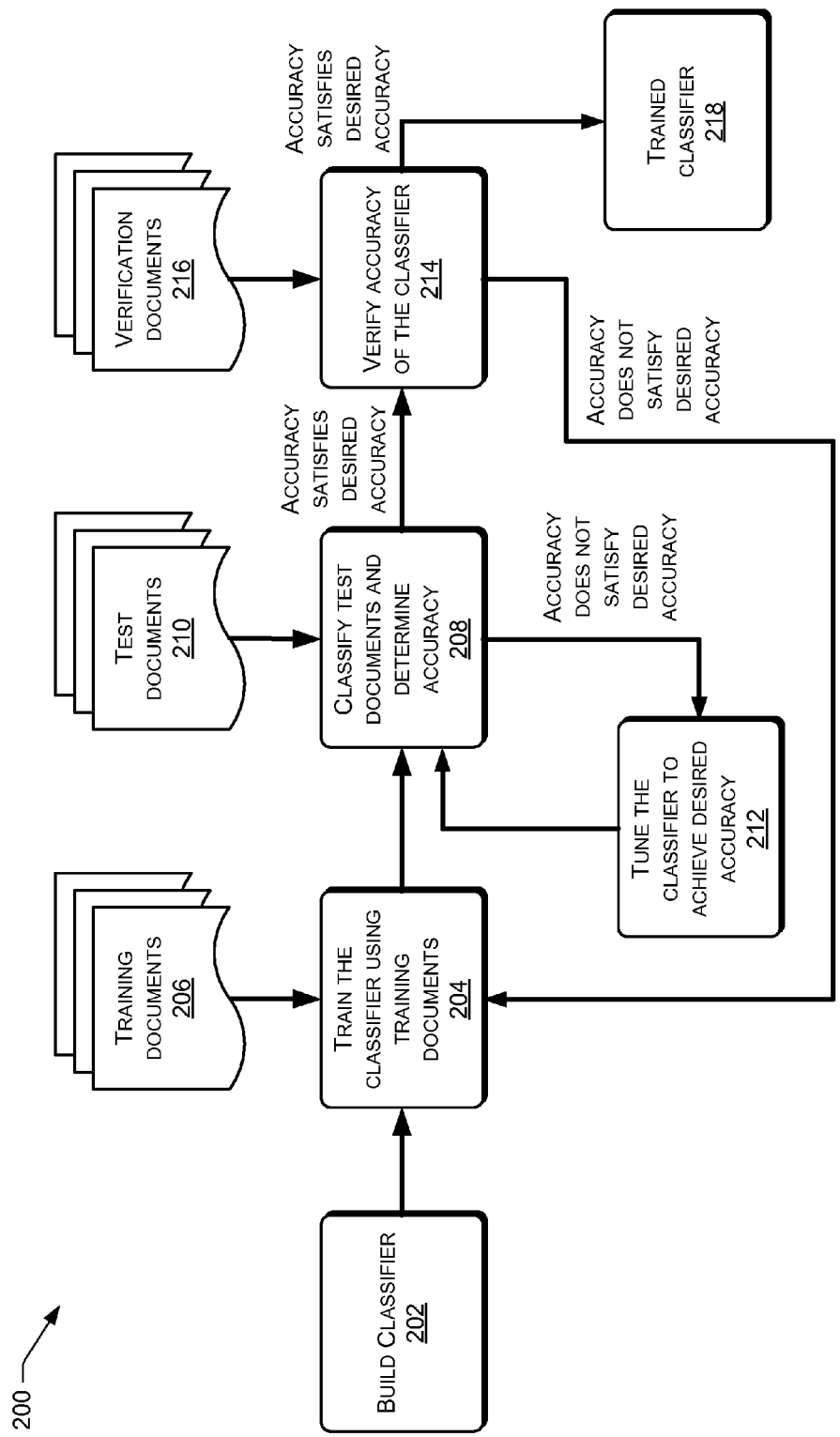
FIG. 2 shows an illustrative process to build and train a classifier according to some implementations.

FIG. 2 shows an illustrative process 200 to build and train a classifier. For example, one or more of the classifier modules 116, 118, 120, or 122 may be built and trained using the process 200. In addition, other types of classifiers that determine a category to be associated with a digital item may be built and trained using the process 200.

At block 202, the classifier is built. For example, software instructions that implement one or more algorithms may be written to build the classifier. The algorithms may implement machine learning, pattern recognition, and other types of algorithms, such as a support vector machine.

At block 204, the classifier may be trained using training documents 206. The training documents 206 may include documents that have been pre-classified into multiple categories (e.g., general audience, erotica, pornography, BIPR, and the like). The training documents 206 may have been pre-classified by a human, by another classifier, or a combination thereof.

At block 208, the classifier may be instructed to classify test documents 210. The test documents 210 may have been pre-classified by a human, by another classifier, or a combination thereof. An accuracy with which the classifier classified the test documents 210 may be determined. If the accuracy does not satisfy a desired accuracy, at 212 the classifier may be tuned to achieve a desired accuracy. The desired accuracy may be a predetermined threshold, such as ninety-percent, ninety-five percent, ninety-nine percent and the like. For example, if the classifier was eighty-percent accurate in classifying the test documents and the desired accuracy is ninety-percent, then the classifier may be further tuned by modifying the algorithms based on the results of classifying the test documents 210. Blocks 208 and 212 may be repeated (e.g., iteratively) until the accuracy of the classifier satisfies the desired accuracy.

When the accuracy of the classifier in classifying the test documents 210 satisfies the desired accuracy, at 208, the process may proceed to 214 where the accuracy of the classifier may be verified using verification documents 216. The verification documents 216 may have been pre-classified by a human, by another classifier, or a combination thereof. The verification process may be performed at 214 to determine whether the classifier exhibits any bias towards the training documents 206 and/or the test documents 210. For example, the verification documents 216 may be documents that are different from both the test documents 210 or the training documents 206. After verifying, at 214, that the accuracy of the classifier satisfies the desired accuracy, the trained classifier 218 may be used to classify digital items. If the accuracy of the classifier does not satisfy the desired accuracy, at 214, then the classifier may be trained using additional training documents, at 204. For example, if the classifier exhibits a bias to words from the training documents 206 and/or the test documents 210, the classifier may be training using additional training documents to reduce the bias.

Thus, a classifier may be trained using training documents and tuned (e.g., the algorithms of the classifier may be modified) to satisfy a desired accuracy. The process 200 may be used to train one or more of the modules 116, 118, 120, or 122. After the desired accuracy of the classifier has been verified, the server 102 may use the classifier to classify digital items submitted for publication.

Each classifier may classify digital items based on words and/or phrases learned from the pre-classified training documents. The classification system used to pre-classify the training documents may therefore determine how each classifier categorizes each digital item. For example, a word-based classifier that determines whether a digital item is to be categorized as including a particular type of content may include word vectors of words derived from training documents that were pre-classified as including the particular type of content. To illustrate, a classifier that determines whether a digital item includes pornography may include word vectors of words derived from documents that were pre-classified as pornography. Therefore, a particular classification system may be quickly and easily modified by re-classifying the training documents and retraining the classifiers. For example, a publisher may initially have a three category system that includes a general audience category, an adult category, and an offensive/illegal category. The training documents may be pre-classified using the three categories and used to train the classifiers. Later, the publisher may desire to expand to a four category system, in which the adult category is replaced with an erotic category and a pornography category, where the erotic category may be associated with artistic content that happens to include sexually explicit content, while the pornography category may be associated with items that have sexually explicit content with little or no artistic value. The publisher may re-categorize the training documents that were previously categorized as adult into either the erotic category or the pornography category and train an erotic classifier and a pornography classifier using the re-categorized training documents.

In some implementations, a publisher that publishes in multiple countries may have a set of classifiers for each country to enable the publisher to classify digital items according to each country's norms/standards and to identify and prevent publication of content that is offensive or illegal in each country. For example, a first set of classifiers may be trained for a first country based on a first pre-classification of the training documents and a second set of classifiers may be trained for a second country based on a second pre-classification of the training documents. Thus, a particular document that is classified as adult content by the first set of classifiers may be classified as offensive/illegal (e.g., unsuitable for publication) by the second set of classifiers.

Illustrative Architectures

Figure 3:
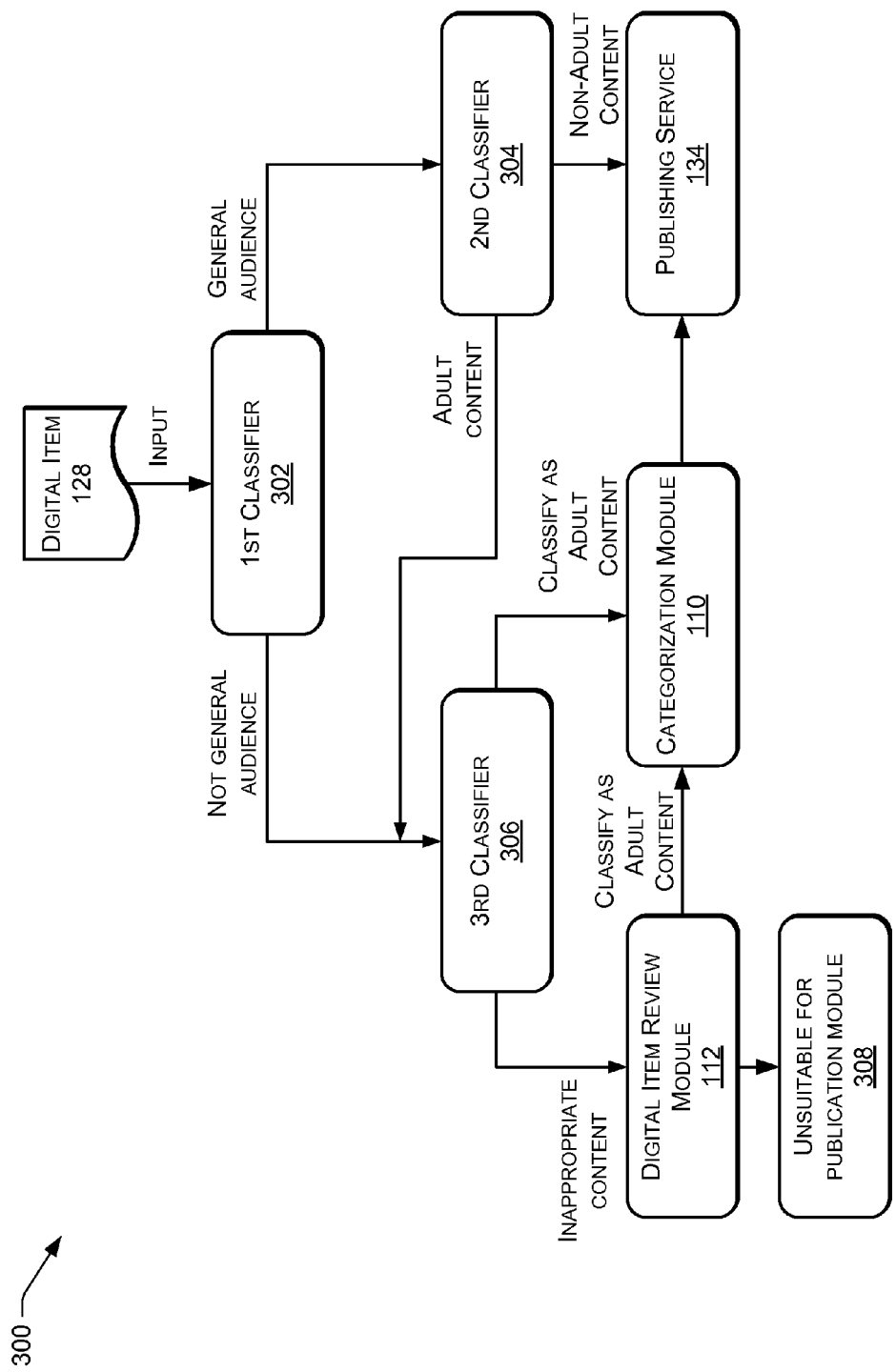
FIG. 3 shows an illustrative architecture 300 that includes three content classifiers for classifying digital items according to some implementations.

FIG. 3 shows an illustrative architecture 300 that includes three content classifiers for classifying digital items. The architecture 300 includes a first classifier 302, a second classifier 304, and a third classifier 306. In some implementations, one or more of the classifiers 302, 304, or 306 may be implemented using support vector machine algorithms or other similar machine-learning algorithms. As illustrated in FIG. 3, the classifiers 302, 304, and 306 may be binary classifiers that determine whether or not a digital item is to be classified with a particular category. Of course, other types of classifiers other than binary classifiers may be used in addition to or instead of one or more of the classifiers 302, 304, or 306.

The first classifier 302, may receive the digital item 128 as input. In response, the first classifier 302 may determine whether a general audience category is to be associated with the digital item 128. For example, the first classifier 302 may determine whether the digital item 128 includes content suitable for a general audience based on the content of the digital item 128, metadata associated with the digital item 128, or both.

If the first classifier 302 determines that the digital item 128 is to be classified as general audience, the digital item 128 may be sent to the second classifier 304 to determine whether the digital item 128 includes adult-oriented content (e.g., erotica or pornography). If the second classifier 304 determines that the digital item 128 does not include (e.g., excludes) adult-oriented content, the second classifier 304 may classify the digital item 128 as suitable for a general audience and send the digital item 128 to the publishing service 134 for publication.

If the first classifier 302 determines that the digital item 128 includes content that is not suitable for a general audience, the digital item 128 may be sent to the third classifier 306. If the second classifier 304 determines that the digital item 128 includes adult-oriented content, then the digital item 128 may be sent to the third classifier 306.

The third classifier 306 may determine whether the digital item 128 includes inappropriate (e.g., offensive, and/or illegal) content. For example, the third classifier 306 may be implemented as a BIPR classifier to determine whether the digital item 128 includes BIPR or other similar or equivalent content. If the third classifier 308 determines that the digital item 128 does not include (e.g., excludes) inappropriate (e.g., offensive or illegal) content, then the third classifier 308 may instruct the categorization module 110 to classify the digital item 128 as adult-oriented material (e.g., erotica or pornography). After classifying the digital item 128 as adult-oriented content, the categorization module 110 may send the digital item 128 to the publishing service 134 for publication. In some implementations, when the digital item 128 is classified as adult-oriented content, a search flag (e.g., the flag 138 of FIG. 1) may be set to exclude the published digital item 128 from search results.

If the third classifier 306 determines that the digital item 128 includes inappropriate content, then the digital item 128 may be sent to the digital item review module 112 for manual review. In some implementations, the portions (e.g., excerpts) that caused the digital item 128 to be classified as inappropriate content may be highlighted or otherwise brought to the attention of a reviewer.

If the manual review determines that the digital item 128 is suitable for publication, then the reviewer may instruct the categorization module 110 to classify the digital item 128 as erotica. After classifying the digital item 128 as erotica, the categorization module 110 may send the digital item 128 to the publishing service 134 for publication. If the manual review determines that the digital item 128 is unsuitable for publication, then the digital item may be classified as unsuitable for publication and sent to an unsuitable for publication module 308. In some cases, the unsuitable for publication module 308 may send a notification to a device of the submitter (e.g., the submitter device 126 of FIG. 1) that the digital item 128 was rejected for publication. The notification may highlight the portions of the digital item 128 that caused the digital item 128 to be classified as inappropriate content to enable a submitter to modify the digital item 128 prior to re-submitting the digital item 128 for publication.

As illustrated in FIG. 3, the classifiers that make decisions at 302, 304, and 308 may be binary classifiers that determine whether the digital item maps to a particular space that is described by multiple word vectors. The classifiers 302, 304, or 308 may include a word-based classifier, a phrase-based classifier, another type of classifier, or any combination thereof. For example, in some implementations, the first classifier 302 and the second classifier 304 may be word-based classifiers while the third classifier 306 may be a phrase-based classifier.

Thus, a publisher may use binary classifiers to determine whether to publish content and to determine a category to associate with items that are suitable for publication. By automating categorizing digital items, the publisher may scale to handle a large quantity of submissions relative to traditional publishers that use manual review for categorization.

Figure 4:
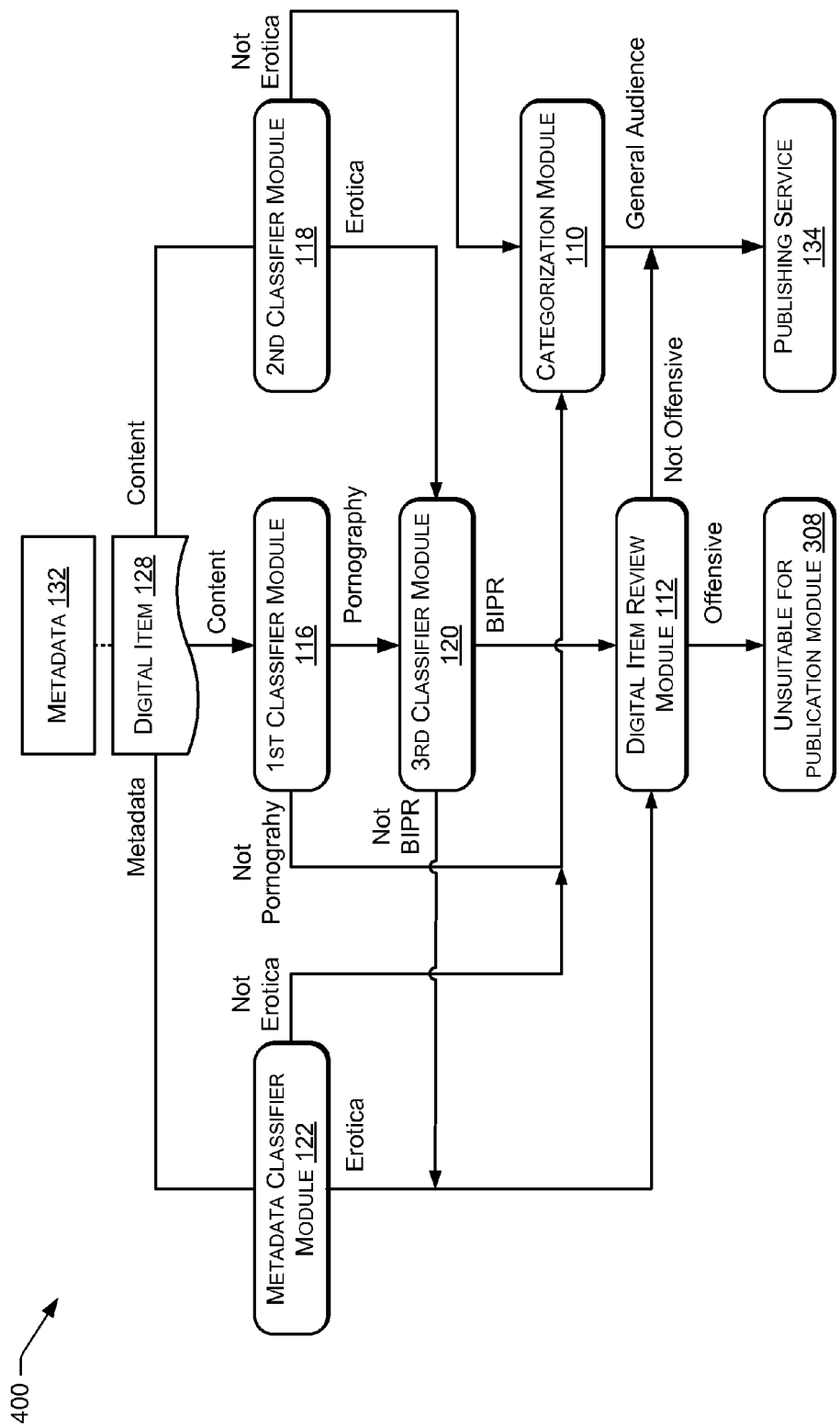
FIG. 4 shows an illustrative process 400 for classifying a digital item according to some implementations.

FIG. 4 shows an illustrative process 400 for classifying a digital item. The architecture 400 includes the first classifier module 116, the second classifier module 118, the third classifier module 120, and the metadata classifier module 122 of FIG. 1. In some implementations, one or more of the classifiers 116, 118, 120, or 122 may be implemented using support vector machine algorithms or other similar machine-learning algorithms. As illustrated in FIG. 4, the classifiers 116, 118, 120, or 122 may be binary classifiers that determine whether a digital item is to be classified with a particular category. Of course, other types of classifiers other than binary classifiers may be used in addition to or instead of one or more of the classifiers 116, 118, 120, or 122.

In some implementations, two or more of the classifiers 116, 118, 120, or 122 may operate independent of each other and in parallel (e.g., substantially contemporaneously). As illustrated in FIG. 4, the classifiers 118, 120, and 122 may operate independently and in parallel to reduce a time taken to classify a digital item compared to an architecture in which the classifiers 118, 120, and 122 are configured to operate serially. However, other implementations that use other arrangements of the classifiers 116, 118, 120, or 122 are possible. For example, in some implementations, the first classifier module 116 may first determine whether the digital item 128 includes inappropriate and/or offensive content. If the first classifier module 116 determines that the digital item 128 excludes BIPR, then the digital item 128 may be sent for classification to two or more of the modules 118, 120, or 122 that are operating in parallel.

In FIG. 4, the classifications/categories erotica and pornography are used as examples of two types of adult-oriented content. For example, erotica may include a first-type of adult-oriented content while pornography may include a second type of adult-oriented content.

In operation, when the digital item 128 and associated metadata 132 are received (e.g., by the server 102 of FIG. 1), the metadata 132 may be sent to the metadata classifier module 122, and the content of the digital item 128 may be sent to the first classifier module 116 and the second classifier module 118. As previously mentioned, in some implementations, the modules 118, 120, and 122 may operate substantially contemporaneously.

The metadata classifier 118 may analyze the metadata 132 to determine whether the metadata 132 is indicative of erotic content. In response to determine that the metadata 132 is indicative of erotic content, the metadata classifier 118 may associate an erotica category with the metadata 132 and send the metadata 132 to the digital item review module 112 for manual review. In response to determine that the metadata 132 is not indicative of erotic content, the metadata classifier 118 may provide information to the categorization module 110 that the metadata 132 is not indicative of erotica.

The first classifier module 116 may receive the content of the digital item 128 and determine whether the digital item 128 includes content indicative of pornography. In response to determining that the digital item 128 includes content indicative of pornography, the first classifier module 116 may classify the digital item 128 as pornography and send the content of the digital item 128 to the first classifier module 116. In response to determining that the digital item 128 includes content that is not indicative of pornography, the first classifier module 116 may provide information to the categorization module 110 that the content of the digital item 128 excludes erotica.

The second classifier module 118 may receive the content of the digital item 128 and determine whether the digital item 128 includes content indicative of erotica. In response to determining that the digital item 128 includes content indicative of erotica, the second classifier module 118 may classify the digital item 128 as erotica and send the content of the digital item 128 to the first classifier module 116. In response to determining that the digital item 128 includes content that is not indicative of erotica, the second classifier module 118 may provide information to the categorization module 110 that the content of the digital item 128 excludes pornography.

If the categorization module 110 receives (i) information from the metadata classifier module 122 that the metadata 132 is not indicative of erotica, (ii) information from the first classifier module 116 that the content of the digital item 128 excludes pornography, and (iii) information from the second classifier module 118 that the content of the digital 128 excludes erotica, then the categorization module 110 may classify the digital item 128 as general audience and send then digital item 128 and the associated metadata 132 to the publishing service 134 for publication.

If the third classifier module 120 receives an indication from the first classifier module 116 that the content of the digital item 128 is classified as pornography, an indication from the second classifier module 118 that the content of the digital item 128 is classified as erotica, or both, the third classifier module 120 may determine whether the digital item 128 includes BIPR or equivalent/similar content. In response to determining that the content of the digital item 128 includes BIPR, the third classifier module 120 may change the classification of the digital item 128 from pornography or erotica to BIPR and send the digital item 128 to the digital item review service for manual review. In response to determining that the content of the digital item 128 excludes BIPR, the third classifier module 120 may send the digital item 128 (e.g., with the classification of erotica or pornography) to the digital item review module 112 for manual review. For example, if the first classifier module 116 classified the digital item 128 as pornography and the third classifier module 120 determines that the digital item 128 does not include BIPR, then the digital item 128 may be sent to the digital item review module 112 with the pornography classification. As another example, if the second classifier module 118 classified the digital item 128 as erotica and the third classifier module 120 determines that the digital item 128 does not include BIPR, then the digital item 128 may be sent to the digital item review module 112 with the erotica classification.

In some implementations, the third classifier module 120 may highlight or otherwise draw attention to one or more words or phrases in the metadata 132 or the content that caused the digital item 128 to be classified as pornography, erotica, or BIPR to enable a reviewer to quickly review the content of the digital item 128. For example, the third classifier module 120 may create a summary sheet identifying particular words or phrases that caused the content of the digital item 128 to be classified as pornography, erotica, or BIPR. In some implementations, the particular words or phrases in the summary sheet may include a hyperlink to enable a reviewer to access the particular words or phrases in the digital item 128. For example, selecting the hyperlink may enable the reviewer to review a context in which the words or phrases occur.

The digital item review module 112 may enable reviewers to review items classified as erotica, pornography, or BIPR to determine whether to publish the items. The digital item review module 112 may enable reviewers to determine a final classification to associate with the items if the items are determined to be suitable for publication. The digital item review module 112 may enable reviewers to review text, graphics, images, and other content of the digital item 128. If a reviewer determines that the digital item 128 is suitable for publication, the digital item 128 may be classified as erotica or pornography and sent to the publishing service 134 for publication. In some cases, the digital item review module 112 may set a flag to enable search results to exclude the digital item 128.

If a reviewer determines that the digital item 128 includes offensive, inappropriate, or illegal content, the digital item 128 may be classified as unsuitable for publication and sent to the unsuitable for publication module 308. In some cases, the unsuitable for publication module 308 may send a notification to a device of the submitter (e.g., the submitter device 126 of FIG. 1) that the digital item 128 was rejected for publication. The notification may highlight the portions of the digital item 128 that caused the digital item 128 to be classified as inappropriate content to enable the submitter to modify the digital item 128 prior to re-submitting the digital item 128 for publication.

Thus, a publisher may use binary classifiers to determine whether to publish content and to determine a category to associate with items that are suitable for publication. In some implementations, two or more of the classifiers may operate substantially contemporaneously (e.g., in parallel) to enable faster classification of digital items relative to architectures in which classifiers operate serially. By automating categorizing digital items, the publisher may scale to handle a large quantity of submissions relative to traditional publishers that use manual review for categorization.

Furthermore, while FIG. 1, FIG. 2, FIG. 3, and FIG. 4 set forth examples of suitable architectures that include classifiers (e.g., classifier modules), numerous other possible architectures, frameworks, systems and environments will be apparent to those of skill in the art in view of the disclosure herein. Additionally, while the examples herein have been described in the environment of eBook classification, other implementations may be directed to other types of digital item classification systems. Thus, the implementations herein may be extended to other types of applications, such as classifying digital audio, classifying digital video, and the like.

Example Processes

In the flow diagrams of FIGS. 5, 6, 7, and 8, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 500, 600, 700, and 800 are described with reference to the architectures 100, 200, 300, and 400, as described above, although other models, frameworks, systems and environments may implement these processes.

Process for Creating a Word-Based Classifier

Figure 5:
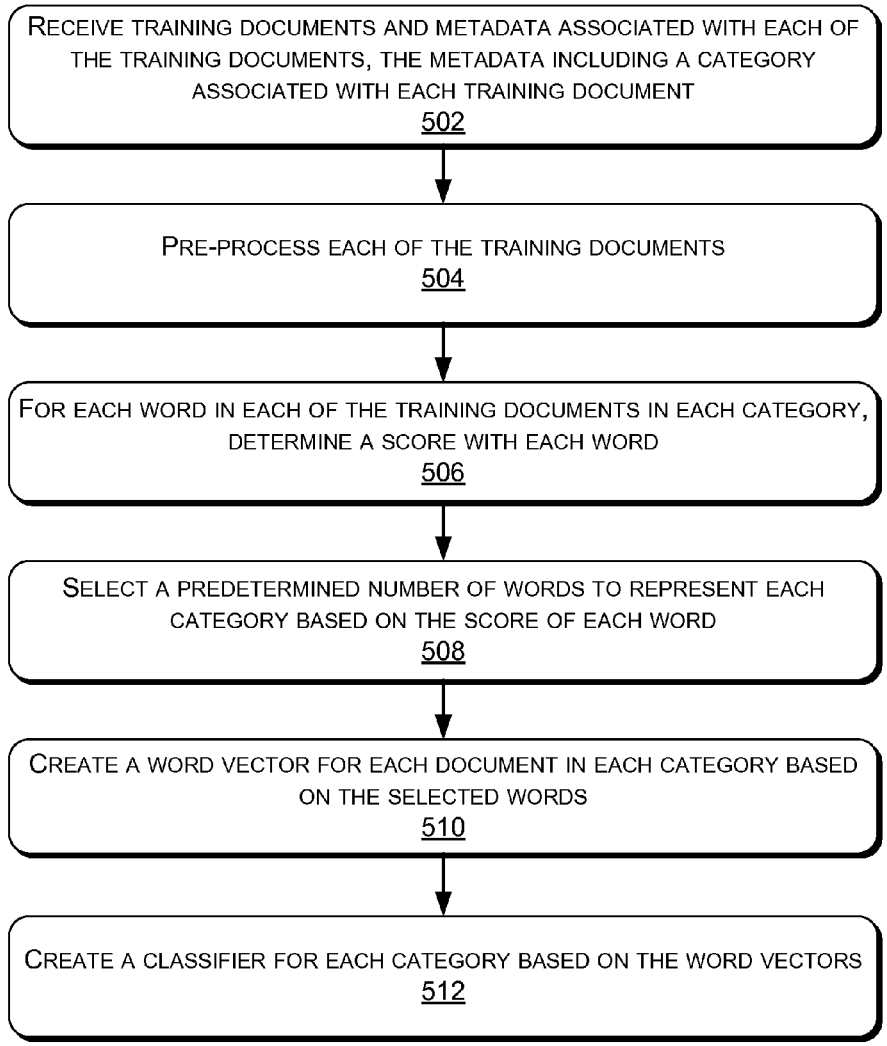
FIG. 5 is a flow diagram of an example process 500 to train a word-based classifier according to some implementations.

FIG. 5 is a flow diagram of an example process 500 to train a word-based classifier according to some implementations. For example, one or more of the classifier modules 116, 118, 120, or 122 of FIG. 1 or the classifiers 302, 304, or 306 of FIG. 3 or may be trained using the process 500.

At 502, training documents and metadata associated with each of the training documents may be received. The metadata may include a category associated with each training document. For example, in FIG. 2, a classifier may receive the pre-classified training documents 206 to train the classifier.

At 504, each of the training documents may be preprocessed. Preprocessing may include removing unwanted characters (e.g., punctuation, numbers, and the like), removing stop words (e.g., words such as "and", "the" and the like that do not meaningfully contribute to determining a category of a document), converting the words to lowercase, stemming inflected or derived words to their stem (e.g., root) form, performing another preprocessing action, or any combination thereof.

At 506, a score may be determined for each word in each of the training documents in each category. For example, the training documents that have been assigned to each category may be analyzed to determine various characteristics, such as a term frequency (TF) and an inverse document frequency (IDF) of each word. The term frequency identifies how frequently each word occurs in a particular document. A word that occurs more frequently may be more indicative of a particular category (e.g., relative to less frequently occurring words). The inverse document frequency measures how unique each word is to each document in each category, e.g., a word that occurs frequently in documents that are in more than one category may be less indicative of the category while a word that occurs frequently in documents in a particular category may be more indicative of the category. The inverse document frequency may be determined by dividing the total number of training documents in a particular category by the number of training documents in the particular category that contain the term, and then taking the logarithm of the quotient. A score may be assigned to a particular word based on the term frequency of the particular word and the inverse document frequency of the particular word. For example, a document may contain 100 words and the word "cow" may appear 3 times in the document. The term frequency for the word "cow" may be calculated as (3/100)=0.03. If there are 10 million training documents and the word "cow" appears in one thousand of these, then the inverse document frequency may be calculated as log(10,000,000/1,000)=4. The word cow may then be associated with a score that is calculated as a product of the term frequency and the inverse document frequency: 0.03×4=0.12. Thus, the score associated with each word may be a fractional number between zero and one. In some implementations, the score may be normalized to account for a length of each document (e.g., how many words are included in the document) to take into account that a particular word may occur more frequently in a longer document than in a shorter document. For example, the term frequency of a particular word in a document may be divided by the frequency of the most common word in the document to calculate a normalized term frequency of the particular word. As another example, the term frequency of a particular word in a document may be divided by the number of words (e.g., after preprocessing) in the document to calculate a normalized term frequency of the particular word.

At 508, based on the score of each word, a predetermined number of words may be selected to represent each category. For example, the N highest scoring words in training documents in a particular category may be selected to represent the particular category. To illustrate, in FIG. 2, when tuning the classifier to achieve the desired accuracy, the number of words N may initially be set to one-thousand words and increased in increments until the desired accuracy is achieved. In some embodiments, N may be between one-thousand and five-thousand words.

At 510, a word vector may be created for each document in each category based on the selected words. For example, if N represents the number of words selected to represent the category, I represents a word in a document, J represents the document, then a word vector for the document in a particular category may be represented as an N-dimensional vector $D_J=\{(W_{IJ})\ldots(W_{NJ})\}$, where $W_{IJ}$ is the weight of the word I in the document J.

At 512, a classifier may be created for each category based on the word vectors. A classifier may be created based on the word vectors for each document in a particular category. For example, the classifier for a particular category may be a matrix in which each row is a word vector that represents each training document in that particular category. The matrix may be mapped to describe areas in multi-dimensional space.

When a new document is received for classification, the classifier for a particular category may create a word vector that represents the new document. The classifier may determine whether the word vector for the new document maps to one of the areas described by the matrix of word vectors that describe the category space. In this way, the classifier for a particular category may determine whether the new document is to be assigned the particular category.

Process for Creating a Phrase-Based Classifier

FIG. 6 is a flow diagram of an example process 600 to train a phrase-based classifier according to some implementations. For example, one or more of the classifier modules 116, 118, 120, or 122 of FIG. 1 or the classifiers 302, 304, or 306 of FIG. 3 or may be trained using the process 600.

As mentioned above, the difference between publishable material (e.g., erotica or pornography) and BIPR may be a few phrases (e.g., excerpts) such that if the phrases were removed, the material might be classified as publishable. For example, in a document that describes a sexual encounter, a phrase indicating that a participant in the sexual encounter is very young might identify content that includes pedophilia. Similarly, a phrase indicating that a participant in the sexual encounter is a family member might identify content that includes incest. A phrase-based classifier to identify inappropriate (e.g., BIPR) content may be trained using phrases (e.g., excerpts) selected from documents that are suitable for publication and phrases selected from documents that are unsuitable for publication.

At 602, first excerpts (e.g., phrases) may be identified from a first set of documents. The first excerpts may cause the first set of documents to be classified as offensive (e.g., BIPR).

At 604, second excerpts may be identified from a second set of documents that are classified as non-offensive (e.g., general audience, erotica, or pornography). In some implementations, the first set of documents, the second set of documents, or both may be preprocessed to remove stop words, punctuation, stem derived words, and the like.

At 606, the classifier may be trained (e.g., as described in FIG. 2) using the first excerpts and the second excerpts. For example, when the phrase-based classifier receives a new document for classification, the phrase-based classifier may break up the new document into phrases. The phrases may be of a fixed length, a variable length, or a combination of both. For example, a predetermined number of words (e.g., fifty, seventy-five, one hundred, and the like) may be repeatedly selected from a sentence to create a phrases having a fixed length. When there are less than the predetermined number of words remaining in the sentence, the remaining words of the sentence may be selected to create a phrase that may vary in length (e.g., based on the length of the sentence).

The phrase-based classifier may analyze the phrases in the new document to determine whether one or more of the phrases indicate that the new document includes BIPR. For example, the phrase-based classifier may determine (e.g., based on the training) whether the new document includes any phrases that are indicative of BIPR. The phrase-based classifier may determine a frequency with which the phrases occur in the new document to determine whether the new document includes BIPR. For example, some documents that may be suitable for publication (e.g., crime novels, biographies, psychotherapy books, and the like) may include phrases that are indicative of BIPR but the phrases may occur relatively infrequently as compared to documents that are unsuitable for publication. In some implementations, the phrase-based classifier may highlight (e.g., call attention to) those phrases that resulted in the classifier identifying BIPR content in a particular document to enable a human reviewer to review the phrases. The phrase-based classifier may be a support vector machine that uses phrase vectors rather than the word vectors used by word-based classifiers. For example, the phrase-based classifier may include a phrase vector that includes phrase-score pairs. Each phrase-score pair may include a particular phrase and a score (e.g., weight) that indicates how uniquely the particular phrase identifies a particular category, such as BIPR. For example, the phrase vector may include {(phrase 1, score 1), (phrase 2, score 2), . . . (phrase N, score N)}. where N is an integer greater than 2.

Processes for Classifying a Digital Item

Figure 7:
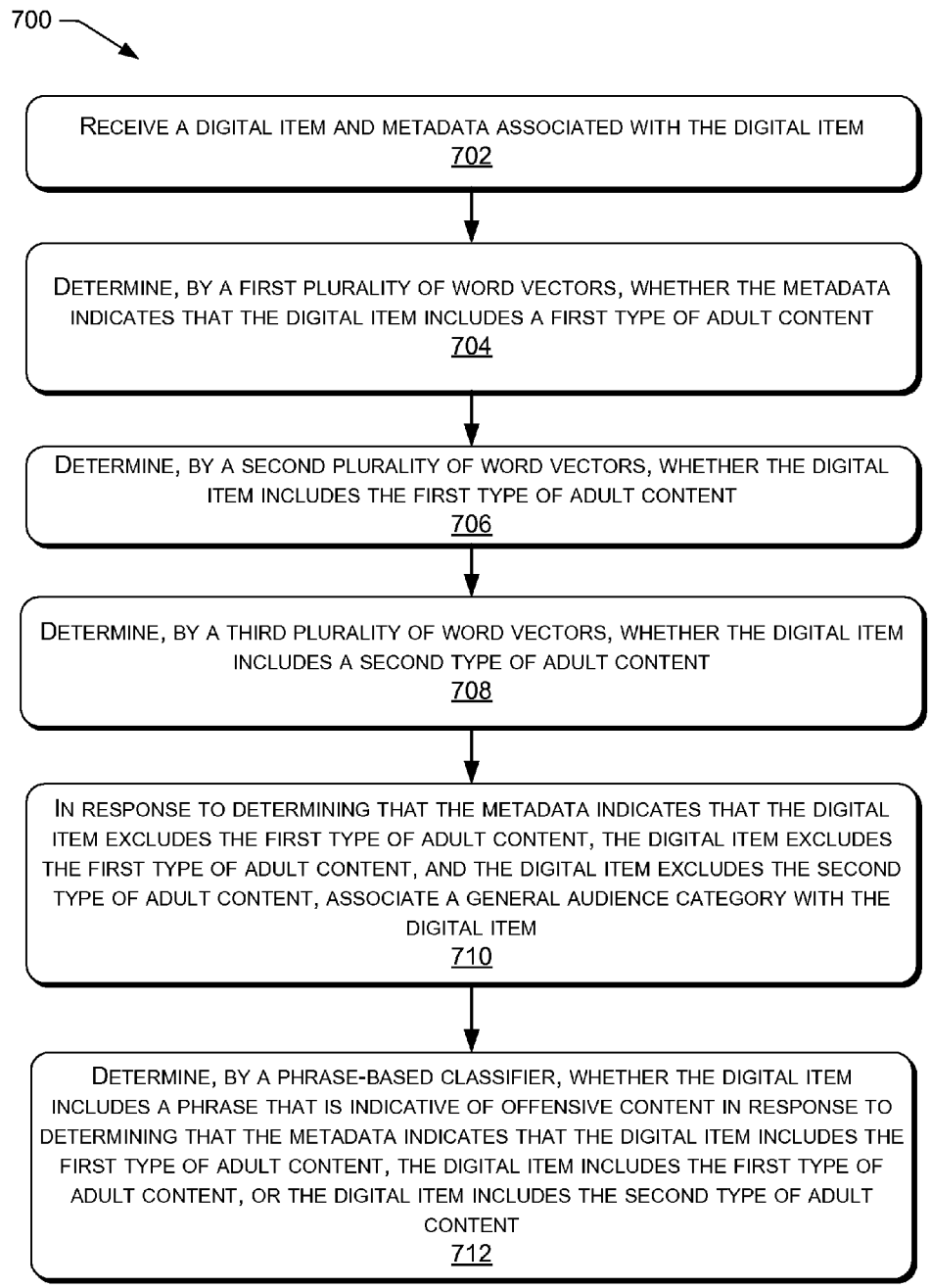
FIG. 7 is a flow diagram of an example process 700 to classify a digital item according to some implementations.

FIG. 7 is a flow diagram of an example process 700 to classify a digital item according to some implementations. For example, one or more of the classifier modules 116, 118, 120, or 122 of FIG. 1 or the classifiers 302, 304, or 306 of FIG. 3 may perform the process 700.

At 702, a digital item and metadata (e.g., a title, a description, and/or other information) associated with the digital item is received. For example, in FIG. 1, the server 102 may receive the digital item 128 and the metadata 132.

At 704, a metadata classifier comprising a first plurality of word vectors may determine whether the metadata indicates that the digital item includes a first type of adult content. For example, in FIG. 1, the metadata classifier module 122 may include a support vector machine algorithm that uses word vectors to determine whether the metadata 132 indicates that the digital item 128 includes a first type of adult content (e.g., erotica).

At 706, a second plurality of word vectors may determine whether the digital item includes the first type of adult content. For example, in FIG. 1, the second classifier module 118 may include a support vector machine algorithm that uses word vectors to determine whether the content of the digital item 128 includes the first type of adult content (e.g., erotica).

At 708, a third plurality of word vectors may determine whether the digital item includes a second type of adult content (e.g., pornography). For example, in FIG. 1, the first classifier module 116 may include a support vector machine algorithm that uses word vectors to determine whether the content of the digital item 128 includes a second type of adult content (e.g., pornography).

At 710, in response to determining that the metadata indicates that the digital item excludes the first type of adult content, determining that the digital item excludes the first type of adult content, and determining that the digital item excludes the second type of adult content, associating a general audience category with the digital item. For example, in FIG. 1, the categorization module 110 may classify the digital item 128 as suitable for a general audience in response to (i) information from the metadata classifier module 122 indicating that the metadata 132 indicates that the digital item 128 excludes the first type of adult content, (ii) information from the first classifier module 116 indicating that the digital item 128 excludes pornography, and (iii) from the second classifier module 118 indicating that the digital item 128 excludes erotica.

In some embodiments, after associating the general audience category with the digital item, the categorization module may automatically (e.g., without human interaction) send the digital item to a publishing service for publication. Thus, when determined to be suitable for a general audience, particular digital items may be published without any manual review occurring, enabling a publisher to quickly publish the particular digital items.

At 712, determining, by a phrase-based classifier, whether the digital item includes a phrase that is indicative of offensive content (e.g., BIPR) in response to (i) determining that the metadata indicates that the digital item includes the first type of adult content, (ii) determining that the digital item includes the first type of adult content, or (iii) determining that the digital item includes the second type of adult content. For example, in FIG. 1, the third classifier module 120 may determine whether one or more phrases in the digital item 128 are indicative of offensive content in response to (i) information from the metadata classifier module 122 indicating that the metadata 132 indicates that the digital item 128 includes erotica, (ii) information from the first classifier module 116 indicating that the digital item 128 includes pornography, or (iii) information from the second classifier module 118 indicating that the digital item 128 includes erotica. To illustrate, the first classifier module 116 may identify phrases in the digital item 128 such that, if the phrases were removed, the digital item 128 may be classified as general audience, pornography, or erotica. In some embodiments, at least of the blocks described in FIG. 7 may be performed substantially contemporaneously (e.g., in parallel). For example, blocks 704, 706, and 708 may be performed substantially contemporaneously.

Figure 8:
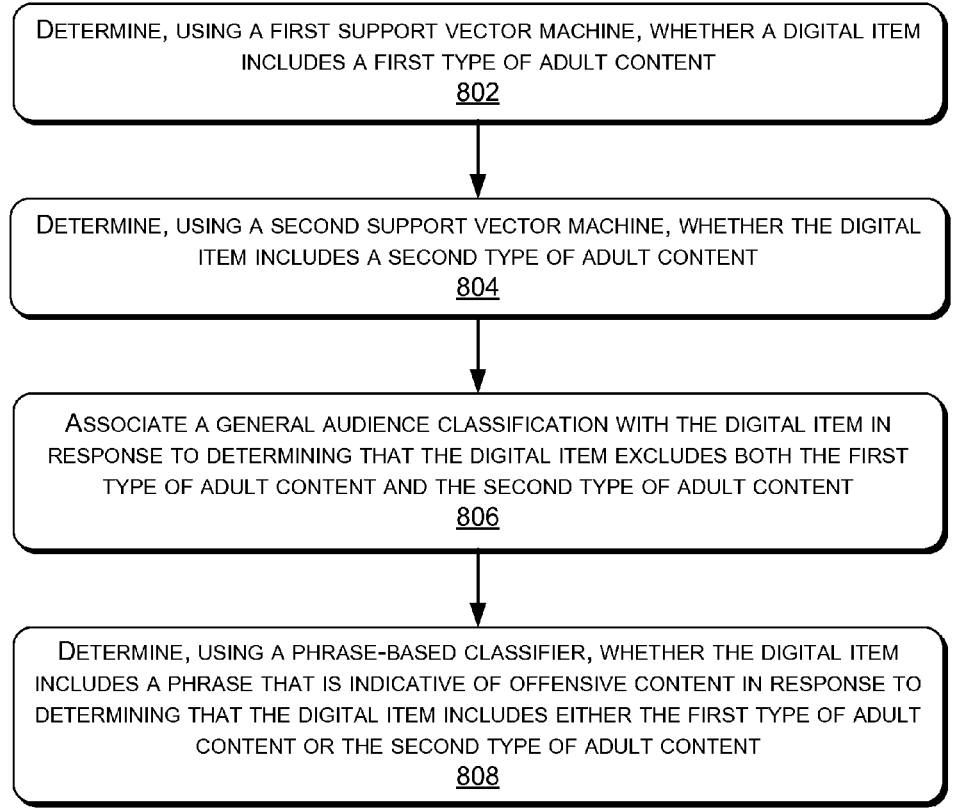
FIG. 8 is a flow diagram of an example process 800 to classify a digital item using support vector machines according to some implementations.

FIG. 8 is a flow diagram of an example process 800 to classify a digital item using support vector machines according to some implementations. For example, one or more of the classifier modules 116, 118, 120, or 122 of FIG. 1 or the classifiers 302, 304, or 306 of FIG. 3 may perform the process 800.

At 802, a first support vector machine may determine whether a digital item includes erotica. For example, in FIG. 4, the first classifier module 116 may include a support vector machine algorithm that uses word vectors to determine whether the content of the digital item 128 includes a first type of adult content (e.g., pornography).

At 804, a second support vector machine may determine whether the digital item includes a second type of adult content (e.g., pornography). For example, in FIG. 1, the second classifier module 118 may include a support vector machine algorithm that uses word vectors to determine whether the content of the digital item 128 includes erotica.

At 806, in response to determining that the digital item excludes both the first type of adult content and the second type of adult content, a general audience category may be associated with the digital item. For example, in FIG. 4, the categorization module 110 may classify the digital item 128 as suitable for a general audience in response to (i) information from the first classifier module 116 indicating that the digital item 128 excludes pornography and (ii) information from the second classifier module 118 indicating that the digital item 128 excludes erotica.

In some embodiments, after associating the general audience category with the digital item, the categorization module may automatically (e.g., without human interaction) send the digital item to a publishing service for publication. Thus, when determined to be suitable for a general audience, particular digital items may be published without any manual review occurring, enabling a publisher to quickly publish the particular digital items.

At 808, a phrase-based classifier may be used to determine whether the digital item includes a phrase that is indicative of offensive content (e.g., BIPR) in response to determining that the digital item includes erotica or pornography. For example, in FIG. 4, the third classifier module 120 may determine whether one or more phrases in the digital item 128 are indicative of offensive content in response to (i) information from the first classifier module 116 indicating that the digital item 128 includes erotica or (ii) information from the second classifier module 118 indicating that the digital item 128 includes erotica. To illustrate, the third classifier module 120 may identify phrases in the digital item 128 such that, if the phrases were removed, the digital item 128 may be classified as general audience, pornography, or erotica.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A server comprising:
   one or more processors;
   a computer-readable storage medium comprising instructions that are executable by the one or more processors to:
   determine, by a first classifier, first classification information indicating that a digital item includes a first type of adult content;
   determine, by a second classifier in parallel with the first classifier, second classification information indicating that the digital item does not include a second type of adult content;
   determine metadata classification information indicating that metadata associated with the digital item indicates that the digital item includes the first type of adult content;
   determine, by a third classifier, third classification information indicating that the digital item includes a third type of content classified as at least one of illegal content or offensive content; and
   associate an offensive classification with the digital item based at least in part on the first classification information, the second classification information, the third classification information and the metadata classification information;
   wherein at least one of the first classifier or the second classifier undergo training to classify the digital item, the training comprising:
   receiving a plurality of training documents;
   receiving a category associated with a first training document of the plurality of training documents;
   preprocessing at least some words in the first training document;
   associating a score with a first word in the first training document, the score based at least partly on:
   a first number of occurrences of the first word in the first training document, and
   a second number of the training documents in which the first word occurs;
   selecting a predetermined number of words as representative words for a first category based at least partly on the score;
   creating a word vector associated with the first training document; and
   creating a classifier for a particular category based at least in part on the word vector.

2. The server of claim 1, wherein the instructions are executable by the one or more processors to:
   determine fourth classification information indicating that second metadata associated with a second digital item indicates that the second digital item does not include the first type of adult content; and
   associate a general audience classification with the second digital item based at least in part on the fourth classification information.

3. The server of claim 1, wherein the instructions are executable by the one or more processors to:
   determine fifth classification information indicating that a third digital item includes the second type of adult content; and
   send the fifth classification information related to the third digital item to the third classifier.

4. The server of claim 1, wherein the instructions are executable by the one or more processors to:
   determine, by the first classifier, that a second digital item excludes the first type of adult content;
   determine, by the second classifier, that the second digital item excludes the second type of adult content;
   determine that second metadata associated with the second digital item indicates that the second digital item excludes the first type of adult content;
   determine that the second metadata indicates that the second digital item excludes the second type of adult content;
   based at least in part on determining that the second digital item excludes both the first type of adult content and the second type of adult content, create an electronic book (eBook) based on the second digital item; and
   provide the eBook for acquisition on a merchant site.

5. The server of claim 1, wherein the instructions are executable by the one or more processors to:
   determine information related to the digital item and a particular classification associated with the digital item;

determine that the digital item includes a phrase that indicates at least one of bestiality-related content, incest-related content, pedophilia-related content, or rape-related content;

modify the particular classification associated with the digital item to the offensive classification; and send the digital item and the particular classification to a digital item review module for manual review.

6. The server of claim 1, wherein the first classifier comprises a multi-dimensional vector including a plurality of phrase-weighting pairs, individual ones of phrase-weighting pairs including a particular phrase and an associated weight.

7. The server of claim 1, wherein the instructions are executable by the one or more processors to send the digital item to a publishing service for publication based at least in part on an indication that the digital item includes content that is suitable for publication.

8. The server of claim 1, wherein the instructions are executable by the one or more processors to send a message to an author of the digital item indicating that the digital item includes content that is unsuitable for publication.

9. The server of claim 1, wherein the training documents include at least one document classified as including the first type of adult content, at least one document classified as including the second type of adult content, and at least one document classified as including general audience content.

10. One or more non-transitory computer-readable storage media including instructions executable by one or more processors to perform operations comprising:

determining, by a first classifier, first classification information indicating that a digital item includes a first type of adult content;

determining, by a second classifier in parallel with the first classifier, second classification information indicating that the digital item does not include a second type of adult content;

determining metadata classification information indicating that metadata associated with the digital item indicates that the digital item includes the first type of adult content;

determining, by a third classifier, third classification information indicating that the digital item includes a third type of content classified as at least one of illegal content or offensive content; and associating an offensive classification with the digital item based at least in part on the first classification information, the second classification information, the third classification information and the metadata classification information;

wherein at least one of the first classifier or the second classifier undergo training to classify the digital item, the training comprising:

receiving a plurality of training documents;

receiving a category associated with a first training document of the plurality of training documents;

preprocessing at least some words in the first training document;

associating a score with a first word in the first training document, the score based at least partly on:

a first number of occurrences of the first word in the first training document, and a second number of the training documents in which the first word occurs;

selecting a predetermined number of words as representative words for a first category based at least partly on the score;

creating a word vector associated with the first training document; and creating a classifier for a particular category based at least in part on the word vector.

11. The one or more non-transitory computer-readable storage media of claim 10, the operations further comprising:

determining fourth classification information indicating that second metadata associated with a second digital item indicates that the second digital item does not include the first type of adult content; and associating a general audience classification with the second digital item based at least in part on the fourth classification information.

12. The one or more non-transitory computer-readable storage media of claim 10, the operations further comprising:

determining fifth classification information indicating that a third digital item includes the second type of adult content; and sending the fifth classification information related to the third digital item to the third classifier.

13. The one or more non-transitory computer-readable storage media of claim 10, the operations further comprising:

determining, by the first classifier, that a second digital item excludes the first type of adult content;

determining, by the second classifier, that the second digital item excludes the second type of adult content;

determining that second metadata associated with the second digital item indicates that the second digital item excludes the first type of adult content;

determining that the second metadata indicates that the second digital item excludes the second type of adult content;

based at least in part on determining that the second digital item excludes both the first type of adult content and the second type of adult content, creating an electronic book (eBook) based on the second digital item; and providing the eBook for acquisition on a merchant site.

14. The one or more non-transitory computer-readable storage media of claim 10, the operations further comprising:

determining information related to the digital item and a particular classification associated with the digital item;

determining that the digital item includes a phrase that indicates at least one of bestiality-related content, incest-related content, pedophilia-related content, or rape-related content;

modifying the particular classification associated with the digital item to the offensive classification; and sending the digital item and the particular classification to a digital item review module for manual review.

15. The one or more non-transitory computer-readable storage media of claim 10, wherein the first classifier comprises a multi-dimensional vector including a plurality of phrase-weighting pairs, individual ones of phrase-weighting pairs including a particular phrase and an associated weight.

16. The one or more non-transitory computer-readable storage media of claim 10, the operations further comprising sending the digital item to a publishing service for publication based at least in part on an indication that the digital item includes content that is suitable for publication.

17. The one or more non-transitory computer-readable storage media of claim 10, wherein the training documents include at least one document classified as including the first type of adult content, at least one document classified as including the second type of adult content, and at least one document classified as including general audience content.

* * * * *